US009098392B1

(12) United States Patent
Gadiraju et al.

(10) Patent No.: US 9,098,392 B1
(45) Date of Patent: Aug. 4, 2015

(54) SYSTEMS AND METHODS FOR CHANGING FENCING MODES IN CLUSTERS

(75) Inventors: Venu Gopal Gadiraju, Andhra Pradesh (IN); Viraj Kamat, Maharashtra (IN); Amol Katkar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 327 days.

(21) Appl. No.: 13/097,605

(22) Filed: Apr. 29, 2011

(51) Int. Cl.
G06F 15/173 (2006.01)
G06F 11/00 (2006.01)
G06F 11/20 (2006.01)

(52) U.S. Cl.
CPC .......... *G06F 11/004* (2013.01); *G06F 11/2023* (2013.01); *G06F 11/2035* (2013.01); *G06F 11/2046* (2013.01)

(58) Field of Classification Search
None
See application file for complete search history.

(56) References Cited

U.S. PATENT DOCUMENTS

| 5,416,921 | A* | 5/1995 | Frey et al. ................ 714/11 |
| 7,590,737 | B1* | 9/2009 | Chen et al. ................ 709/226 |
| 7,631,066 | B1* | 12/2009 | Schatz et al. .............. 709/224 |
| 2008/0209136 | A1* | 8/2008 | Qi et al. ................... 711/148 |
| 2011/0289344 | A1* | 11/2011 | Bae et al. .................. 714/4.2 |

FOREIGN PATENT DOCUMENTS

WO   WO 2004019582 A1 *  3/2004 ............. H04L 29/06

OTHER PUBLICATIONS

Mike Duckett. The Two-Phase Commit Protorol. Apr. 30, 1995. All pages.*
Amol Katkar et al.; System and Methods for Switching to a New Coordinator Resource; U.S. App. No. 11/341,301; filed Jan. 27, 2006.

* cited by examiner

*Primary Examiner* — Mohamed Wasel
*Assistant Examiner* — Tsung Wu
(74) *Attorney, Agent, or Firm* — ALG Intellectual Property, LLC

(57) ABSTRACT

A computer-implemented method for changing fencing modes in clusters may include (1) identifying a cluster of nodes configured with a fencing mode for resolving split-brain scenarios within the cluster, (2) identifying a request to reconfigure the cluster of nodes with a new fencing mode, (3) transmitting the request to each node in the cluster of nodes, (4) in response to the request, for each node in the cluster of nodes, testing the operability of the new fencing mode from the node, (5) receiving a message from the node indicating the success of the test; and, after receiving the message indicating the success of the test from every node within the cluster of nodes, and (6) reconfiguring each node within the cluster of nodes to use the new fencing mode. Various other methods, systems, and computer-readable media are also disclosed.

15 Claims, 6 Drawing Sheets

SYSTEMS AND METHODS FOR CHANGING FENCING MODES IN CLUSTERS

BACKGROUND

Computing clusters may provide various advantages over non-clustered computing systems. For example, clusters may provide services with high availability, enable load balancing for large computational workloads, and/or provide more computational power with less powerful constituent nodes.

A cluster may include one or more resources that are shared between nodes within the cluster, such as one or more storage devices. Thus, multiple nodes within the cluster may access the same data. By working in concert, the nodes of a cluster may safely access and alter data for clustered applications. The nodes of a cluster may also work in concert to reconfigure the cluster itself. For example, if some nodes in a cluster become disconnected from the cluster, other nodes in the cluster may attempt to take on the responsibilities of the disconnected nodes.

Unfortunately, under some conditions two parts of a cluster may lose communication with each other yet still have access to shared cluster resources. In this case, each part of the cluster may attempt to take over the responsibilities for the entire cluster without coordinating with the other part of the cluster. This may lead to undesirable results such as corrupted application data.

In order to handle such "split-brain" scenarios, a cluster may be configured to isolate out-of-communication nodes from shared resources using one of several fencing techniques. However, in order to change a cluster from one fencing mode to another, an administrator using traditional cluster technologies may need to first halt cluster operations. Accordingly, the instant disclosure identifies a need for additional and improved methods for changing fencing modes in clusters.

SUMMARY

As will be described in greater detail below, the instant disclosure generally relates to systems and methods for changing fencing modes in clusters. In some examples, the systems described herein may accomplish such a task by (1) identifying a cluster of nodes configured with a fencing mode for resolving split-brain scenarios within the cluster, (2) identifying a request to reconfigure the cluster of nodes with a new fencing mode, (3) transmitting the request to each node in the cluster of nodes, (4) in response to the request, for each node in the cluster of nodes, testing the operability of the new fencing mode from the node, (5) receiving a message from the node indicating the success of the test and, after receiving the message indicating the success of the test from every node within the cluster of nodes, (6) reconfiguring each node within the cluster of nodes to use the new fencing mode.

The new fencing mode may include any of a variety of approaches for implementing fencing in the cluster. For example, the new fencing mode may include regulating access to a storage device shared by the cluster with a plurality of storage devices that support persistent reservation. In another example, the new fencing mode may include regulating access to a storage device with at least one coordination point server.

Testing the operability of the new fencing mode from each node may include any of a variety of steps, depending on the new fencing mode. For example, if the new fencing mode is to regulate access to a storage device by using storage devices that support persistent reservation, testing the operability of the new fencing mode may include (1) testing whether the node correctly identifies the plurality of storage devices and (2) testing whether the node can communicate with each storage device within the plurality of storage devices. In another example, if the new fencing mode is to regulate access to a storage device by using at least one coordination point server, testing the operability of the new fencing mode may include (1) testing whether the node correctly identifies the coordination point server and (2) testing whether the node can communicate with the coordination point server.

The systems described herein may reconfigure each node in the cluster of nodes without interfering with various cluster operations. For example, these systems may reconfigure each node within the cluster of nodes without first halting output operations from the node. Additionally or alternatively, the cluster of nodes may be configured to execute at least one application and these systems may reconfigure each node within the cluster of nodes to use the new fencing mode without interrupting the operation of the application.

In some examples, the systems described herein may prepare the cluster of nodes to change fencing modes in response to the request. For example, these systems may, in response to the request, on each node within the cluster of nodes, initialize an agent configured to operate the new fencing mode.

A system for migrating virtual machines may include one or more processors configured to execute an identification module, a transmission module, a testing module, and a reconfiguration module. The identification module may be programmed to (1) identify a cluster of nodes configured with a fencing mode for resolving split-brain scenarios within the cluster and (2) identify a request to reconfigure the cluster of nodes with a new fencing mode. The transmission module may be programmed to transmit the request to each node in the cluster of nodes. The testing module may be programmed to, in response to the request, for each node in the cluster of nodes, (1) test the operability of the new fencing mode from the node and (2) receive a message from the node indicating the success of the test. The reconfiguration module may be programmed to, after receiving the message indicating the success of the test from every node within the cluster of nodes, reconfigure each node within the cluster of nodes to use the new fencing mode.

By coordinating the knowledge, testing, and/or initialization of a new fencing mode among the nodes of a cluster by first validating the new fencing mode and then committing to the new fencing mode, the systems and methods described herein may allow administrators to change the fencing mode of a cluster without interrupting the operation of a cluster.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
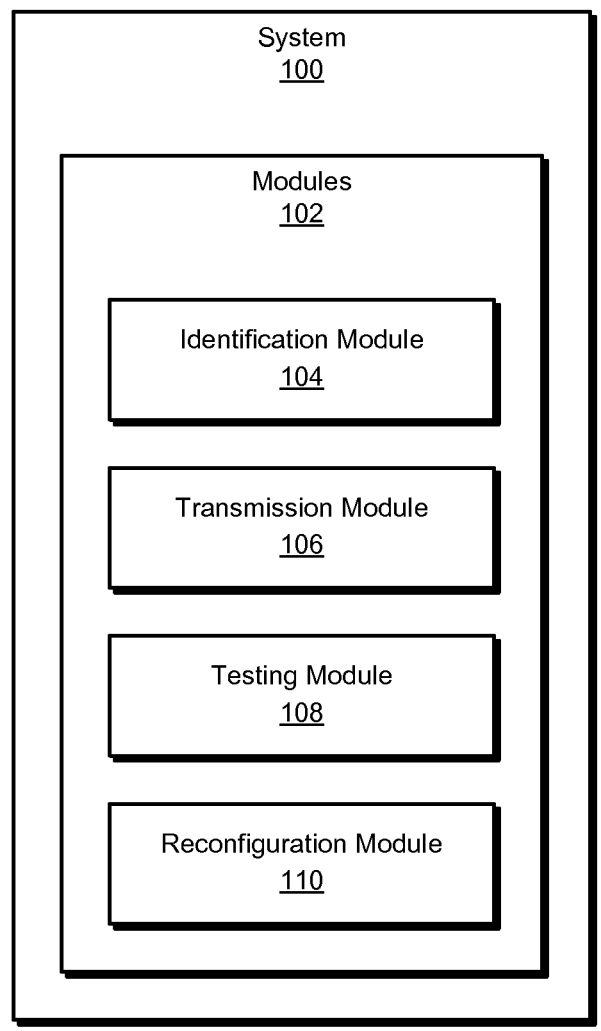
FIG. 1 is a block diagram of an exemplary system for changing fencing modes in clusters.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
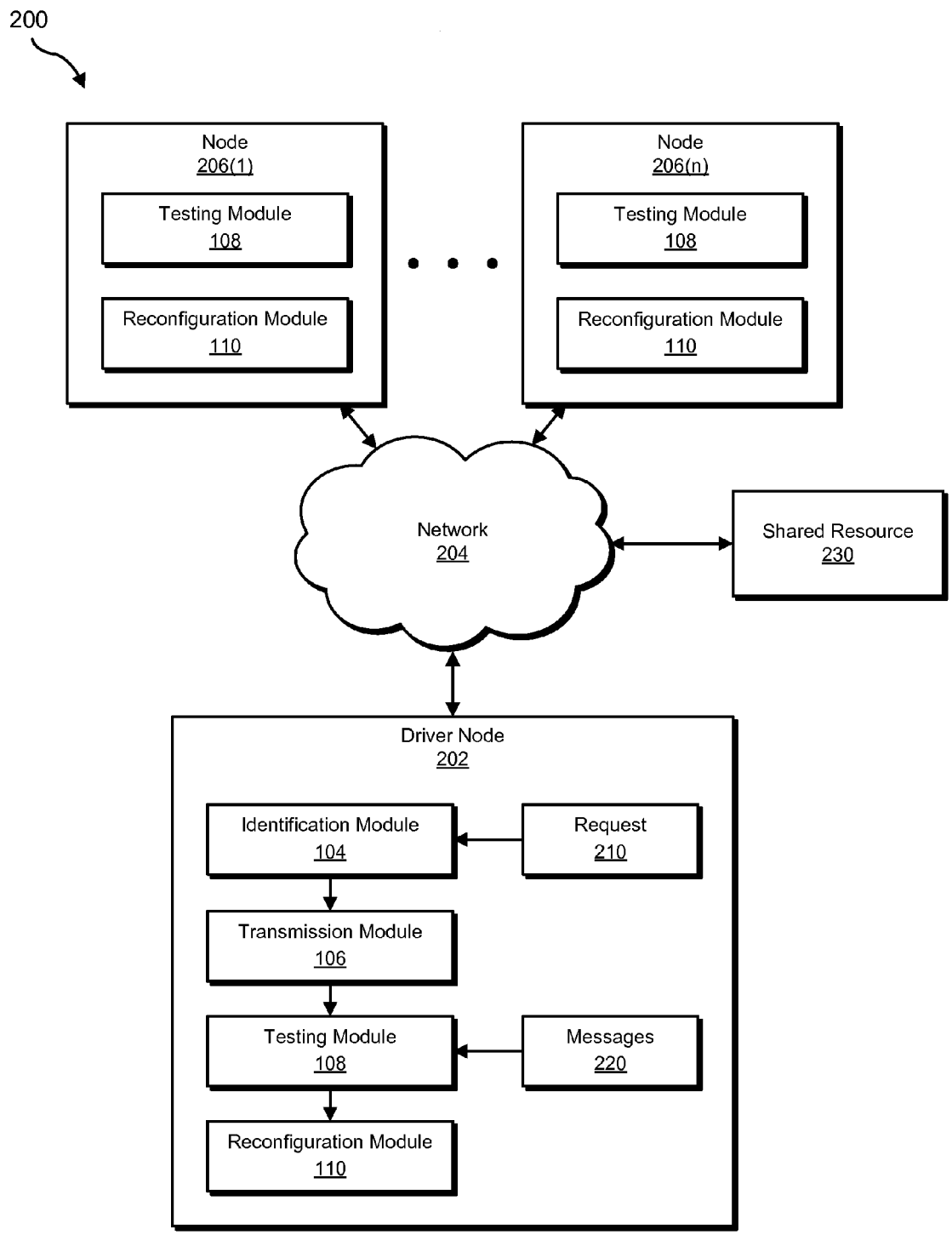
FIG. 2 is a block diagram of an exemplary system for changing fencing modes in clusters.
Figure 3:
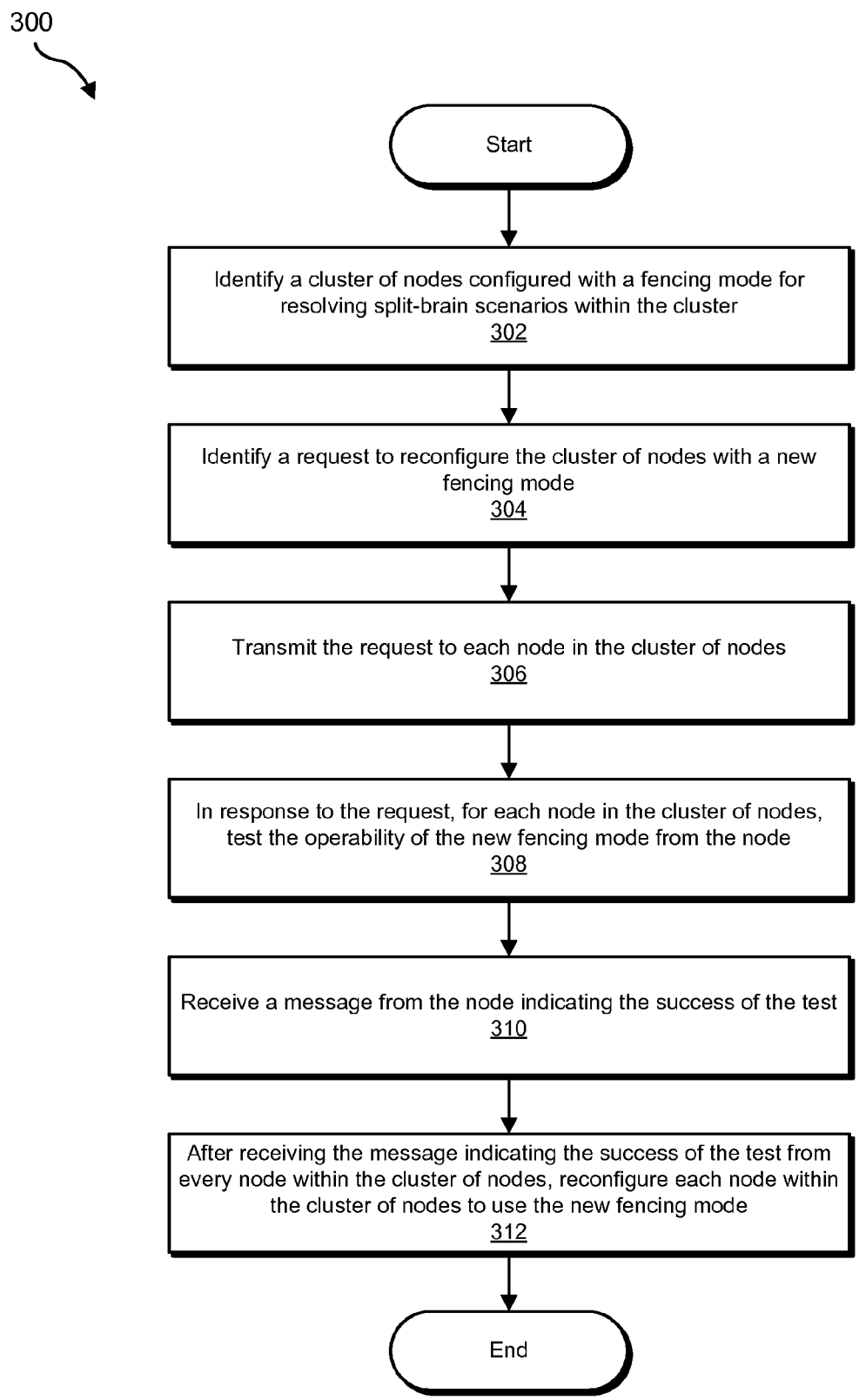
FIG. 3 is a flow diagram of an exemplary method for changing fencing modes in clusters.
Figure 4:
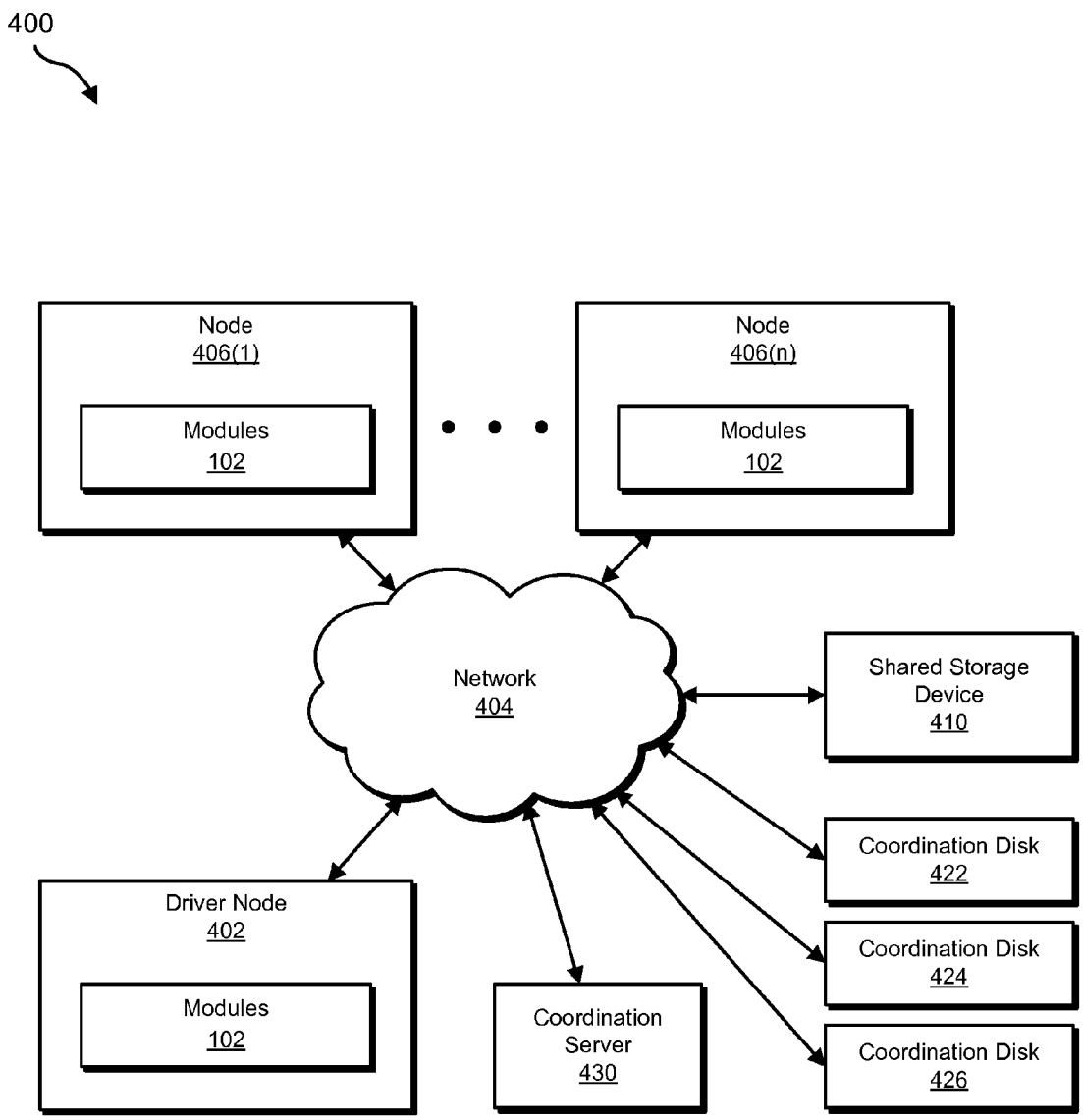
FIG. 4 is a block diagram of an exemplary system for changing fencing modes in clusters.

The following will provide, with reference to FIGS. 1, 2, and 4, detailed descriptions of exemplary systems for changing fencing modes in clusters. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for changing fencing modes in clusters. As illustrated in this figure, exemplary system 100 may include one or more modules 102 for performing one or more tasks. For example, and as will be explained in greater detail below, exemplary system 100 may include an identification module 104 programmed to (1) identify a cluster of nodes configured with a fencing mode for resolving split-brain scenarios within the cluster and (2) transmit the request to each node in the cluster of nodes. Exemplary system 100 may also include a transmission module 106 programmed to transmit the request to each node in the cluster of nodes. Exemplary system 100 may additionally include a testing module 108 programmed to, in response to the request, and for each node in the cluster of nodes, (1) test the operability of the new fencing mode from the node and (2) receive a message from the node indicating the success of the test.

In addition, and as will be described in greater detail below, exemplary system 100 may include a reconfiguration module 110 programmed to, after receiving the message indicating the success of the test from every node within the cluster of nodes, reconfigure each node within the cluster of nodes to use the new fencing mode. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., driver node 202 and/or nodes 206(1)-(n)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary cluster 200 illustrated in FIG. 2. As shown in FIG. 2, cluster 200 may include a driver node 202 in communication with nodes 206(1)-(n) and a shared resource 230 via a network 204. In one embodiment, and as will be described in greater detail below, one or more of modules 102 from FIG. 1 may program driver node 202 and/or nodes 206(1)-(n) to change the fencing mode of cluster 200 by (1) identifying a cluster of nodes (e.g., cluster 200) configured with a fencing mode for resolving split-brain scenarios within the cluster, (2) identifying a request (e.g., a request 210) to reconfigure the cluster of nodes with a new fencing mode, (3) transmitting the request to each node in the cluster of nodes (e.g., to nodes 206(1)-(n)), (4) in response to the request, for each node in the cluster of nodes, testing the operability of the new fencing mode from the node (e.g., testing the operability of the new fencing mode from each of nodes 206(1)-(n)), (5) receiving a message from the node indicating the success of the test (e.g., receiving one or more messages 220 at driver node 202) and, after receiving the message indicating the success of the test from every node within the cluster of nodes, (6) reconfiguring each node within the cluster of nodes to use the new fencing mode.

Driver node 202 generally represents any type or form of computing device capable of reading computer-executable instructions. Examples of driver node 202 include, without limitation, servers, desktops, laptops, cellular phones, personal digital assistants (PDAs), multimedia players, embedded systems, combinations of one or more of the same, exemplary computing system 510 in FIG. 5, or any other suitable computing device. In some examples, driver node 202 may be configured with a fencing module and/or driver.

Nodes 206(1)-(n) generally represent any type or form of computing device that is capable of reading computer-executable instructions. Examples of driver node 202 include, without limitation, servers, desktops, laptops, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between driver node 202 and nodes 206(1)-(n).

Shared resource 230 generally represents any resource accessible by two or more nodes within cluster 200. Shared resource 230 may represent portions of a single device or a plurality of devices. In one embodiment, shared resource 230 may represent at least a portion of one or more storage devices.

FIG. 3 is a flow diagram of an exemplary computer-implemented method 300 for changing fencing modes in clusters. The steps shown in FIG. 3 may be performed by any suitable computer-executable code and/or computing system. In some embodiments, the steps shown in FIG. 3 may be performed by one or more of the components of system 100 in FIG. 1 and/or cluster 200 in FIG. 2.

As illustrated in FIG. 3, at step 302 one or more of the systems described herein may identify a cluster of nodes configured with a fencing mode for resolving split-brain scenarios within the cluster. For example, at step 302 identification module 104 may, as part of driver node 202 in FIG. 2, identify cluster 200.

As used herein, the phrase "split-brain scenario" may refer to any scenario and/or condition under which one or more nodes within a cluster may improperly access a shared resource due to a lack of coordination between two or more nodes within the cluster. For example, a split-brain scenario may arise when two or more nodes within the cluster lose communication with each other. In some examples, the nodes within the cluster may conduct primary operations (e.g., operations related to services provided by the cluster and/or applications running on the cluster) across a primary network and may verify the status of nodes using a separate communication channel. For example, the nodes within the cluster may use a separate network to allow nodes to exchange heartbeat messages. The failure of a node to transmit a heartbeat message may result in that node being decommissioned from the cluster and/or one or more nodes from the cluster substituting for the failed node. In some examples, a split-brain scenario may arise when two groups of nodes within the cluster each internally maintain communication but each fail to receive heartbeat messages from the other group of nodes. In these examples, each group of nodes may attempt to take charge of the cluster and may perform conflicting and/or redundant operations with shared resources, potentially resulting in operational inconsistencies and/or corrupted data.

As used herein, the phrase "fencing mode" may refer to any configuration, setting, and/or defined procedure for isolating one or more nodes in a cluster from a shared resource. For example, a fencing mode may define how a cluster arbitrates between two or more nodes out of proper communication in a split-brain scenario. In some examples, a fencing mode may configure a cluster to use coordination disks to determine rights to a shared resource. In these examples, each group of nodes within a split brain scenario may race to make reservations with the coordination disks for rights to access the shared resource (e.g., the group of nodes successfully making reservations with the majority of the coordination disks being granted the rights to the shared resource). Additionally or alternatively, a fencing mode may configure a cluster to use a coordination server to determine which group of nodes may access the shared resource. In some examples, a fencing mode may configure a fencing module to operate directly on coordination resources. In other examples, a fencing mode may configure a fencing module to spawn one or more agents to perform fencing operations. For example, a fencing mode may include a "SCSI-3" fencing mode. In another example, a fencing mode may include a "customized" fencing mode.

Identification module 104 may perform step 302 in any suitable manner. For example, identification module 104 may identify the cluster configured with the fencing mode simply by executing on a node on the cluster. Additionally or alternatively, identification module 104 may identify the cluster by reading a configuration file identifying the cluster and/or receiving a communication from the cluster.

FIG. 4 is a block diagram of an exemplary cluster 400. As illustrated in FIG. 4, cluster 400 may include a driver node 402 in communication with nodes 406(1)-(n), a shared storage device 410, coordination disks 422, 424, and 426, and a coordination server 430 over a network 404. Using FIG. 4 as an example, identification module 104 may, as part of driver node 402, identify cluster 400.

Returning to FIG. 3, at step 304 one or more of the systems described herein may identify a request to reconfigure the cluster of nodes with a new fencing mode. For example, at step 304 identification module 104 may, as part of driver node 202 in FIG. 2, identify request 210 to reconfigure cluster 200 with a new fencing mode. Using FIG. 4 as an example, at step 304 identification module 104 may, as part of driver node 402, identify a request to reconfigure cluster 400 with a new fencing mode.

The new fencing mode may include any of a variety of configurations, such as the examples of fencing modes provided earlier. For example, the new fencing mode may include regulating access to a storage device shared by the cluster with a plurality of storage devices that support persistent reservation. Additionally or alternatively, the new fencing mode may include regulating access to a storage device shared by the cluster with at least one coordination point server.

Using FIG. 4 as an example, cluster 400 may initially be configured with a fencing mode to regulate access to shared storage device 410 via coordination disks 422, 424, and 426. Coordination disks 422, 424, and 426 may implement SCSI-3 standards, including persistent reservation. Each node within cluster 400 may register a key with each of coordination disks 422, 424, and 426. According to the fencing mode, during a split-brain scenario, nodes within cluster 400 may issue a command to the coordination disks to remove the registration of competing nodes. Unregistered nodes within cluster 400 may then be unable to issue commands to the coordination disks. A fencing module may then eject unregistered nodes from cluster 400. However, an administrator may decide to change fencing modes within the cluster. Accordingly, identification module 104 may identify a request to reconfigure cluster 400 with a new fencing mode. The new fencing mode may include regulating access to shared storage device 410 via coordination server 430. According to the new fencing mode, during a split-brain scenario, nodes within cluster 400 may submit to the arbitration of coordination server 430. The new fencing mode may also dictate that fencing operations be carried out by agents operating in the cluster.

Identification module 104 may identify the request in any suitable manner. For example, identification module 104 may receive the request from an administrator workstation. Additionally or alternatively, identification module 104 may receive the request from an automated process that identifies a need to change fencing modes (e.g., because a resource relied upon by the current fencing mode, such as a coordination disk or a coordination server, has become or will become unavailable).

Returning to FIG. 3, at step 306 one or more of the systems described herein may transmit the request to each node in the cluster of nodes. For example, at step 306 transmission module 106 may, as part of driver node 202 in FIG. 2, transmit request 210 to nodes 206(1)-(n). Using FIG. 4 as an example, at step 306 transmission module 106 may, as part of driver node 402, transmit the request to nodes 406(1)-(n).

Transmission module 106 may transmit the request in any suitable manner. For example, transmission module 106 may simply forward the request to the nodes in the cluster. Additionally or alternatively, transmission module 106 may reformat the request before sending the request to the nodes. In some examples, transmission module 106 may transmit the request to the nodes in the cluster in the form of an instruction to each node to prepare to change fencing modes. In some examples, transmission module 106 may transmit the request to each node directly from a driver node (e.g., a node on which a fencing driver and/or module operates). Additionally or alternatively, transmission module 106 may be configured to propagate the request through the cluster via one or more nodes in the cluster.

At step 308, one or more of the systems described herein may, in response to the request, for each node in the cluster of nodes, test the operability of the new fencing mode from the node. For example, at step 308 testing module 108 may, as part of each of nodes 206(1)-(*n*) in FIG. 2, test the operability of the new fencing mode from each respective node. Using FIG. 4 as an example, at step 308 testing module 108 may, as part of each of nodes 406(1)-(*n*), test the operability of the new fencing mode from each respective node.

Testing module 108 may test the operability of the new fencing mode from each node using any of a variety of approaches, depending on the new fencing mode. For example, if the new fencing mode is to regulate access to a storage device by using storage devices that support persistent reservation, testing module 108 may test the operability of the new fencing mode by (1) testing whether the node correctly identifies the plurality of storage devices and (2) testing whether the node can communicate with each storage device within the plurality of storage devices. For example, testing module 108 may collect identifying information for the plurality of storage devices and compare the identifying information with identifying information gathered by other nodes. If the identifying information matches, testing module 108 may conclude that the node correctly identifies the plurality of storage devices. Testing module 108 may then test communication with each storage device by attempting a communication with each storage device (e.g., a communication that does not meaningfully change the state of the storage device). Additionally or alternatively, testing module 108 may recognize a recent successful communication with one or more of the storage devices in the plurality of storage devices as a successful test.

In another example, if the new fencing mode is to regulate access to a storage device by using a coordination point server, testing module 108 may test the operability of the new fencing mode by (1) testing whether the node correctly identifies the coordination point server and (2) testing whether the node can communicate with the coordination point server. For example, testing module 108 may collect identifying information for the coordination point server and compare the identifying information with identifying information gathered by other nodes. If the identifying information matches, testing module 108 may conclude that the node correctly identifies the coordination point server. Testing module 108 may then test communication with the coordination point server by attempting a communication with the coordination point server (e.g., with a ping message and/or other functionless communication). Additionally or alternatively, testing module 108 may recognize a recent successful communication with the coordination point server as a successful test.

Returning to FIG. 3, at step 310 one or more of the systems described herein may receive a message from the node indicating the success of the test. For example, at step 310 testing module 108 may, as part of driver node 202 in FIG. 2, receive messages 220 from each of nodes 206(1)-(*n*). Using FIG. 4 as an example, at step 310 testing module 108 may, as part of driver node 402, receive a message from each of nodes 406(1)-(*n*) verifying the operability of the new fencing mode from each node.

Testing module 108 may perform step 310 in any suitable manner. For example, testing module 108 may receive an explicit message from each node indicating the success of the test. Additionally or alternatively, testing module 108 may receive a message from one or more nodes indicating one or more results of the test which indicate the success of the test. For example, testing module 108 may aggregate information about the view of a coordination resource from each node and determine whether the view across the nodes is consistent to determine whether the test was successful for each node.

At step 312, one or more of the systems described herein may, after receiving the message indicating the success of the test from every node within the cluster of nodes, reconfigure each node within the cluster of nodes to use the new fencing mode. For example, at step 312 reconfiguration module 110 may, as part of driver node 202 and/or nodes 206(1)-(*n*) in FIG. 2, reconfigure nodes 206(1)-(*n*) to use the new fencing mode. Using FIG. 4 as an example, at step 310 reconfiguration module 110 may, as part of driver node 402 and/or nodes 406(1)-(*n*), reconfigure nodes 406(1)-(*n*) to use the new fencing mode.

Reconfiguration module 110 may perform step 312 in a variety of ways. For example, reconfiguration module 110 may, as a part of a driver node, send a message to each node within the cluster of nodes committing to the new fencing mode. In some examples, reconfiguration module 110 may send the message to every node simultaneously. Additionally or alternatively, reconfiguration module 110 may run a wrapper command that internally initiates communication with cluster nodes for changing the fencing mode. In some examples, reconfiguration module 110, as a part of each node in the cluster of nodes, receive a message committing to the new fencing mode and commit the node to the new fencing mode.

In some examples, reconfiguration module 110 may reconfigure each node in the cluster of nodes without interfering with the operation of the cluster. For example, reconfiguration module 110 may reconfigure each node within the cluster of nodes without first halting output operations from the node. Additionally or alternatively, the cluster of nodes may be configured to execute at least one application and reconfiguration module 110 may reconfigure each node within the cluster of nodes to use the new fencing mode without interrupting the operation of the application. In some examples, reconfiguration module 110 may reconfigure each node within the cluster of nodes to use the new fencing mode without unloading and/or restarting a fencing module and/or driver configured to perform fencing operations. Accordingly, a product stack and applications running on the cluster may not require a restart.

In some examples, reconfiguration module 110 may also prepare the cluster of nodes to change fencing modes in response to the request. For example, reconfiguration module 110 may, in response to the request to change to the new fencing mode, initialize an agent on each node within the cluster of nodes configured to operate the new fencing mode on the node. In this manner, when the new fencing mode has been validated by each node and committed to (e.g., by a message broadcast from a fencing driver node), each node may be immediately ready to start operating in the new mode.

By coordinating the knowledge, testing, and/or initialization of a new fencing mode among the nodes of a cluster by first validating the new fencing mode and then committing to the new fencing mode, the systems and methods described herein may allow administrators to change the fencing mode of a cluster without interrupting the operation of a cluster.

Figure 5:
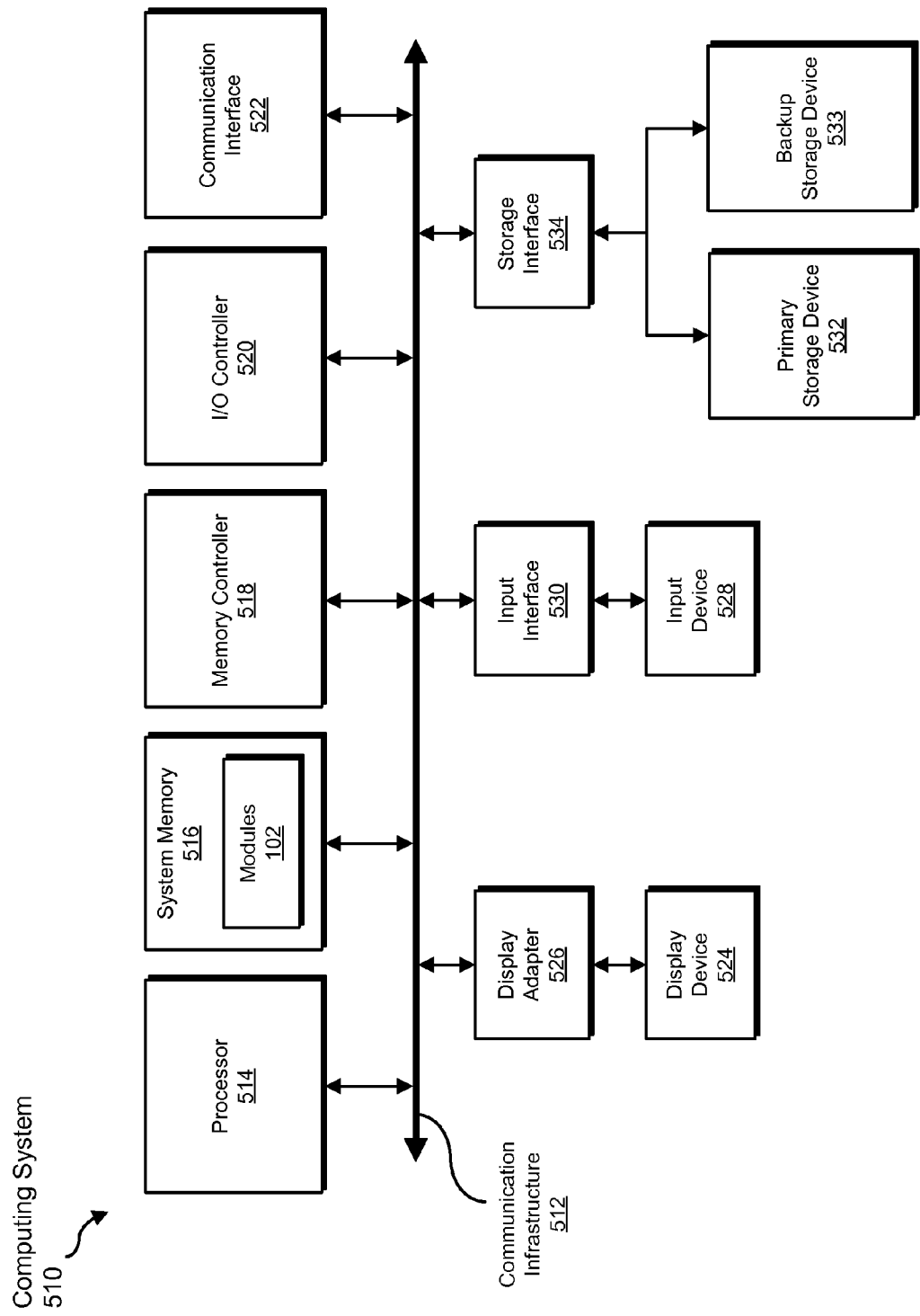
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, regulating, transmitting, testing, receiving, reconfiguring, and/or initiating steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, regulating, transmitting, testing, receiving, reconfiguring, and/or initiating.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, regulating, transmitting, testing, receiving, reconfiguring, and/or initiating steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, regulating, transmitting, testing, receiving, reconfiguring, and/or initiating steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, regulating, transmitting, testing, receiving, reconfiguring, and/or initiating steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, regulating, transmitting, testing, receiving, reconfiguring, and/or initiating steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
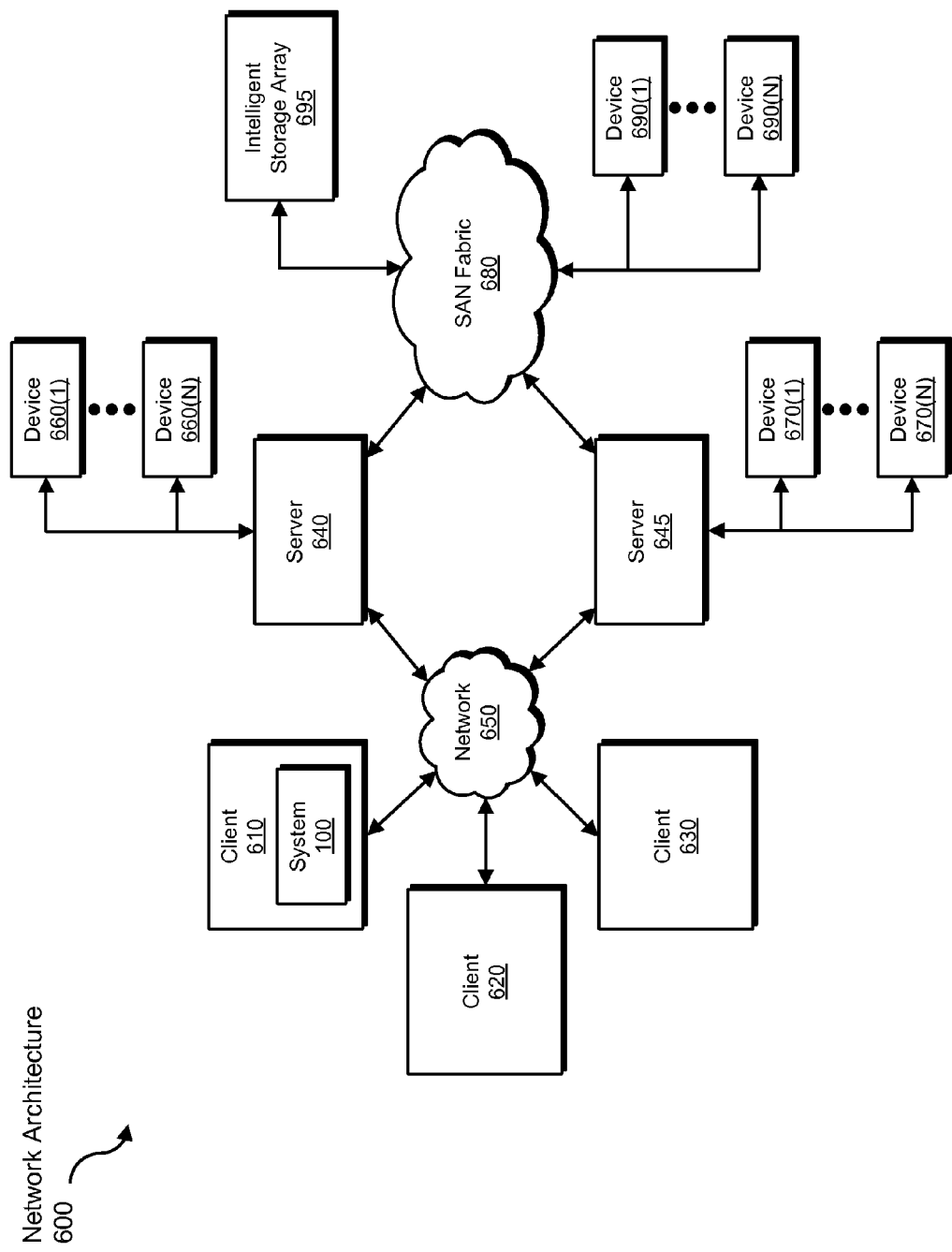
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, regulating, transmitting, testing, receiving, reconfiguring, and/or initiating steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for changing fencing modes in clusters.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a cluster configured with one fencing mode into a cluster with a different fencing mode.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for changing fencing modes in clusters, at least a portion of the method being performed by a computing device comprising at least one processor, the method comprising:
    identifying a cluster of nodes configured with a functioning fencing mode for resolving split-brain scenarios within the cluster;
    identifying at least one application regulated by the functioning fencing mode running on at least one node in the cluster of nodes;
    identifying a request to reconfigure the cluster of nodes with a new fencing mode while the cluster of nodes is not in a split-brain scenario;
    transmitting the request to each node in the cluster of nodes;
    in response to the request, for each node within the cluster of nodes:
        testing the operability of the new fencing mode from the node;
        receiving a message from the node indicating a success of the test;
    after receiving the message indicating the success of the test from every node within the cluster of nodes, reconfiguring each node within the cluster of nodes to use the new fencing mode without first halting output operations from the application on the node to at least one resource to which access was regulated by the functioning fencing mode.

2. The computer-implemented method of claim 1, wherein the new fencing mode comprises regulating access to a storage device shared by the cluster with a plurality of storage devices that support persistent reservation.

3. The computer-implemented method of claim 2, wherein testing the operability of the new fencing mode from the node comprises:

testing whether the node correctly identifies the plurality of storage devices;
testing whether the node can communicate with each storage device within the plurality of storage devices.

4. The computer-implemented method of claim 1, wherein the new fencing mode comprises regulating access to a storage device shared by the cluster with at least one coordination point server.

5. The computer-implemented method of claim 4, wherein testing the operability of the new fencing mode from the node comprises:
testing whether the node correctly identifies the coordination point server;
testing whether the node can communicate with the coordination point server.

6. The computer-implemented method of claim 1, further comprising, in response to the request, on each node within the cluster of nodes, initiating an agent configured to operate the new fencing mode.

7. A system for changing fencing modes in clusters, the system comprising:
an identification module programmed to:
identify a cluster of nodes configured with a functioning fencing mode for resolving split-brain scenarios within the cluster;
identify at least one application regulated by the functioning fencing mode running on at least one node in the cluster of nodes;
identify a request to reconfigure the cluster of nodes with a new fencing mode while the cluster of nodes is not in a split-brain scenario;
a transmission module programmed to transmit the request to each node in the cluster of nodes;
a testing module programmed to, in response to the request, for each node within the cluster of nodes:
test the operability of the new fencing mode from the node;
receive a message from the node indicating a success of the test;
a reconfiguration module programmed to, after receiving the message indicating the success of the test from every node within the cluster of nodes, reconfigure each node within the cluster of nodes to use the new fencing mode without first halting output operations from the application on the node to at least one resource to which access was regulated by the functioning fencing mode;
at least one processor configured to execute the identification module, the transmission module, the testing module, and the reconfiguration module.

8. The system of claim 7, wherein the new fencing mode comprises regulating access to a storage device shared by the cluster with a plurality of storage devices that support persistent reservation.

9. The system of claim 8, wherein the testing module is programmed to test the operability of the new fencing mode from the node by:
testing whether the node correctly identifies the plurality of storage devices;
testing whether the node can communicate with each storage device within the plurality of storage devices.

10. The system of claim 7, wherein the new fencing mode comprises regulating access to a storage device shared by the cluster with at least one coordination point server.

11. The system of claim 10, wherein the testing module is programmed to test the operability of the new fencing mode from the node by:
testing whether the node correctly identifies the coordination point server;
testing whether the node can communicate with the coordination point server.

12. The system of claim 7, wherein the reconfiguration module is further programmed to, in response to the request, on each node within the cluster of nodes, initiate an agent configured to operate the new fencing mode.

13. A non-transitory computer-readable-storage medium comprising one or more computer-executable instructions that, when executed by at least one processor of a computing device, cause the computing device to:
identify a cluster of nodes configured with a functioning fencing mode for resolving split-brain scenarios within the cluster;
identify at least one application regulated by the functioning fencing mode running on at least one node in the cluster of nodes;
identify a request to reconfigure the cluster of nodes with a new fencing mode while the cluster of nodes is not in a split-brain scenario;
transmit the request to each node in the cluster of nodes;
in response to the request, for each node within the cluster of nodes:
test the operability of the new fencing mode from the node;
receive a message from the node indicating a success of the test;
after receiving the message indicating the success of the test from every node within the cluster of nodes, reconfigure each node within the cluster of nodes to use the new fencing mode without first halting output operations from the application on the node to at least one resource to which access was regulated by the functioning fencing mode.

14. The computer-readable-storage medium of claim 13, wherein the new fencing mode comprises regulating access to a storage device shared by the cluster with a plurality of storage devices that support persistent reservation.

15. The computer-readable-storage medium of claim 14, wherein testing the operability of the new fencing mode from the node comprises:
testing whether the node correctly identifies the plurality of storage devices;
testing whether the node can communicate with each storage device within the plurality of storage devices.

* * * * *